United States Patent
Kubota

[11] 3,729,041
[45] Apr. 24, 1973

[54] TIRE
[75] Inventor: Hirokazu Kutoba, Kobe, Japan
[73] Assignee: Matsushita Electric Industrial Co., Ltd., Osaka, Japan
[22] Filed: Apr. 14, 1971
[21] Appl. No.: 134,001

[30] Foreign Application Priority Data

| | | |
|---|---|---|
| May 17, 1967 | Japan | 42/31811 |
| May 17, 1967 | Japan | 42/31812 |
| May 30, 1967 | Japan | 42/35048 |
| May 30, 1967 | Japan | 42/35049 |

[52] U.S. Cl. ........................152/353, 152/DIG. 12
[51] Int. Cl. .......................................B60c 13/00
[58] Field of Search .............152/DIG. 12, 353, 152/330

[56] References Cited

UNITED STATES PATENTS

| | | | |
|---|---|---|---|
| 3,253,634 | 5/1966 | Young | 152/353 |
| 2,742,942 | 4/1956 | Owen | 152/DIG. 12 |
| 3,449,201 | 6/1969 | Palmquist et al. | 152/353 |
| 2,574,233 | 11/1951 | Wolf | 152/DIG. 12 |
| D128,632 | 8/1941 | Lee | 152/353 |

FOREIGN PATENTS OR APPLICATIONS

| | | | |
|---|---|---|---|
| 460,557 | 1/1937 | Great Britain | 152/DIG. 12 |

*Primary Examiner*—Robert G. Sheridan
*Assistant Examiner*—Richard A. Bertsch
*Attorney*—Stevens, Davis, Miller & Mosher

[57] ABSTRACT

The invention relates to a novel means for realizing a "whitewall" type tire. The tire comprises dual layer sidewalls wherein the inner layer is the colored layer while the outer layer is an abrasion or wear-resistant layer. An annular groove is formed in said outer layer to expose to view the underlying colored layer.

7 Claims, 13 Drawing Figures

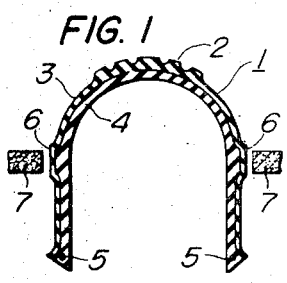
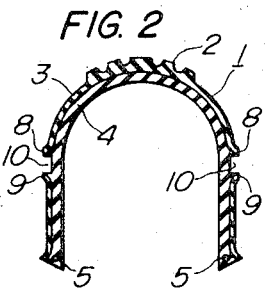
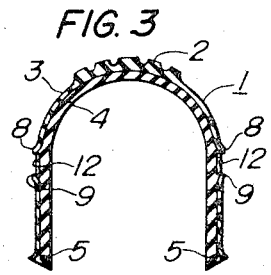
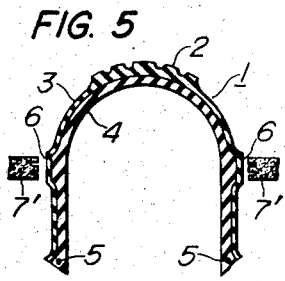
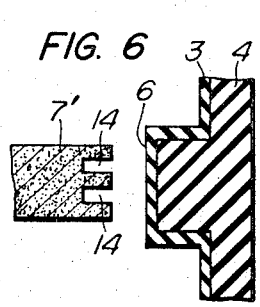
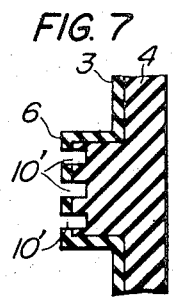
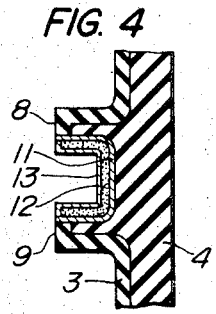
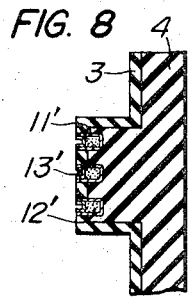
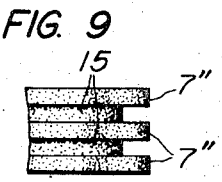
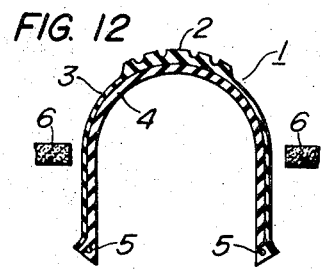
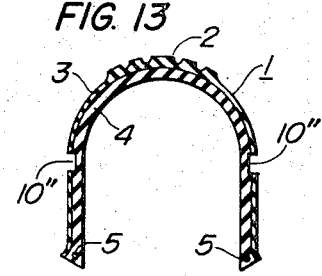

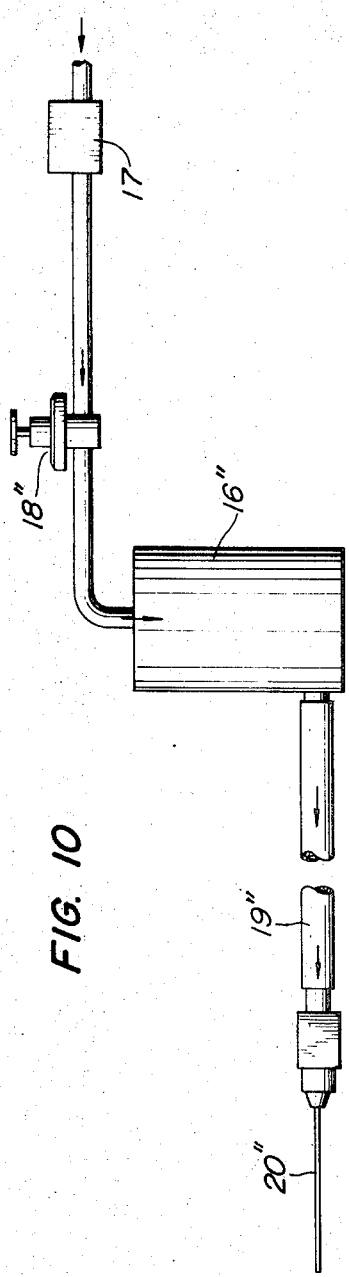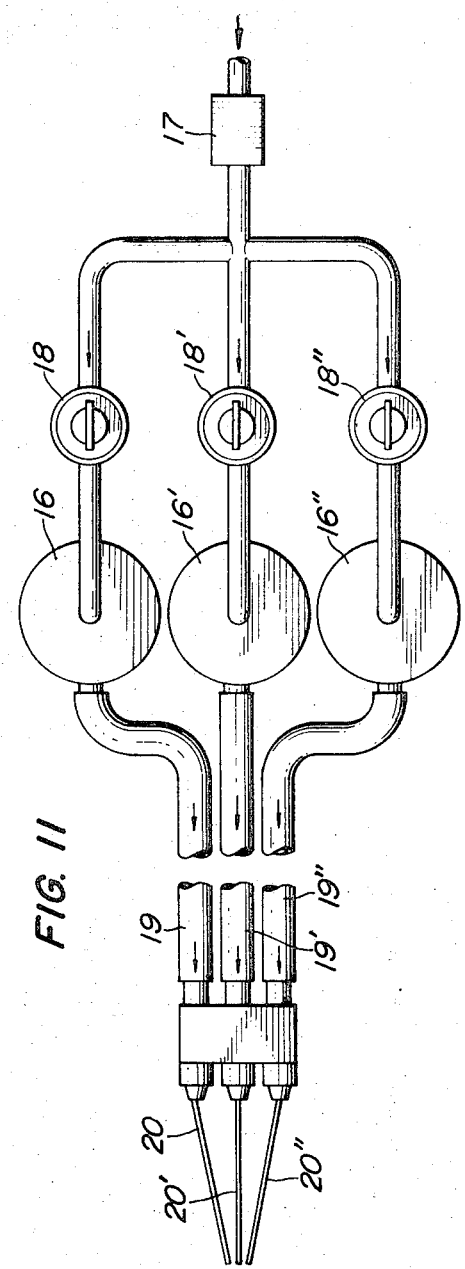
FIG. 10
FIG. 11

TIRE

CROSS REFERENCE TO RELATED APPLICATION

This is the divisional application of the U. S. Ser. No. 689,903 filed on Dec. 12, 1967, now U.S. Pat. No. 3,607,498.

BACKGROUND OF THE INVENTION

1. Field of the Invention

The present invention relates to tires for automobiles and bicycles, and more particularly relates to a tire having on the exterior surface, particularly on the side walls, thereof a band or bands of fluorescent colors visible even in the nighttime.

2. Description of the Prior Art

Tires are known which have a rubber paint or paints coated on the entire or a part of the side walls thereof for decorative purposes or for improving the weather-resistance of the tires. Also, tires are known which are provided on each side wall thereof with a band or bands, or a pattern of colors which are formed by a method comprising constructing the side wall portions of the tires with a plurality of layers of different colors, forming on each side wall an annular projection or projections by means of a mold and grinding said annular projection or projections to expose the inner layers of different colors. However, the tires of the former type were not durable for a long period of service because of the insufficient bonding strength between the paint and the tire body, whereas the tires of the latter type had the drawback that the production thereof invovled difficult processes, making it impossible to produce more than two bands or patterns on one side wall, and furthermore the colors obtained were not sufficiently fresh due to the action of sulfur which was used in the tire body as a vulcanizer.

SUMMARY OF THE INVENTION

It is an object of the present invention to provide a tire having on the exterior surface and particularly on the side walls thereof a fluorescent color band or bands which will not be readily detached therefrom, said color band or bands being the result of grinding the side wall of the tire body to form an annular groove or grooves and filling said annular groove or grooves with a fluorescent paint.

It is another object of the present invention to provide at low cost a tire having a plurality of fluorescent color bands of different colors.

It is still another object of the present invention to provide a tire having a fluorescent color band or bands which will withstand the flexion of the tire body during use and therefore will not be detached readily from the tire body, and which will remain fresh over a lengthy period of time without being subjected to the advsere affect of the compounds, particularly the vulcanizing agent, contained in the rubber material of the tire, said tire comprising a body with an abrasion-resistant outer rubber layer and inner rubber layer containing a color-developing compound, the exterior surface of the tire body including a single or a plurality of annular grooves having the inner rubber layer exposed at the bottom thereof and further comprising in said annular groove or grooves a laminate of an undercoating layer of a transparent graft polymer based on chloroprene and a top-coating layer of a fluorescent paint.

It is still another object of the present invention to provide a tire having a fluorescent color band or band invulnerable to ultraviolet rays, said color band or bands comprising an ultraviolet ray absorbing compound in the fluorescent paint layer or a superposed top-coating layer containing the ultraviolet ray absorbing compound on top of said fluorescent paint layer in the tire described in the preceding paragraph.

BRIEF DESCRIPTION OF THE DRAWINGS

FIG. 1 is a cross section of a bicycle tire on each side wall of which a single fluorescent color band is to be formed;

FIG. 2 is a cross section of the tire having an annular groove formed on each side wall thereof for receiving a fluorescent paint therein;

FIG. 3 is a cross section of the tire shown in FIG. 2 with a fluorescent paint layer formed in said respective grooves;

FIG. 4 is a cross section, in enlargement, of the annular groove having the fluorescent paint layer formed therein;

FIG. 5 is a cross section of a tire on each side of which a plurality of fluorescent color bands are to be formed;

FIG. 6 is a cross section, in enlargement, showing that portion of the side wall on which a plurality of fluorescent color bands are to be formed and a grinder to be used for the grinding of said portion;

FIG. 7 is a cross section, in enlargement, of the portion of the side wall shown in FIG. 6 with a plurality of grooves formed therein;

FIG. 8 is a cross section, in enlargement, of the annular grooves shown in FIG. 7 each having a fluorescent paint layer formed therein;

FIG. 9 is a fragmentary cross section showing the essential portion of another form of the grinder shown in FIG. 6;

FIG. 10 is a side elevation, partly broken away, of a device for the injection of a fluorescent paint or paints in the annular groove or grooves in the side wall of the tire;

FIG. 11 is a plan view of the device shown in FIG. 10;

FIG. 12 is a cross section of a tire in each side wall of which a single fluorescent color band is to be formed by another method; and FIG. 13 is a cross section of the tire shown in FIG. 12 having an annular groove formed in each side wall thereof.

DESCRIPTION OF THE PREFERRED EMBODIMENTS

First of all, a method by which a single fluorescent color band is formed on each side wall of a tire will be described with references to FIGS. 1 to 4.

Planary rubber sheets for constructing a tire body are produced by calender rolls and two of such rubber sheets are laminated by a calender rolls and two of such rubber sheets are laminated by a doubling calender to form a unit tire body. In this case, that one of the rubber sheets which will be located interior of the product tire is produced in a whitish color by mixing in the material rubber composition therefor titanium dioxide, zinc oxide or zinc sulfide, so as to impart to said rubber sheet constituting the inner layer of the tire a color developing function before hand. The material rubber composition for the formation of the color-developing inner layer of the tire should be composed of a non-discoloring vulcanizing agent and an antioxidant, and it is particularly important that the amount of sulfur to be added as a vulcanizer should be limited to 1.5 to 1.75 parts by weight so as not to impair the freshness of a fluorescent paint layer to be formed thereon later.

As a preferred example, the material rubber composition for the formation of the color-developing inner layer of the tire is composed of 100 parts of natural rubber, 60 parts of titanium dioxide, 10 parts of zinc oxide, 50 parts of calcium carbonate as a filler, 1.75 parts of sulfur, 3 parts of stearic acid, 0.8 part of dibenzothiazyl disulfide as an accelerator, 1.5 parts of 2,5-di-tert.-butylhydroquinone and 0.02 part of a blue pigment. The color-developing layer plays a highly important role in promoting the luminous effect of the fluorescent layer, producing a suitable roughness on the surface thereof exposed by grinding by a grinder and promoting the anchoring effect of the undercoating layer, acting as an anchor layer, so as to improve the bond between the exposed surface of the inner layer and the paint layer to be formed thereon.

The laminate of the rubber sheets is molded into the shape of a tire and thereafter placed in a vulcanizing metal mold which is formed in the interior wall thereof with opposed annular grooves. Upon completion of the vulcanization, a tire is produced with an annular projection formed on each side wall thereof as shown in FIG. 1. As seen, the tire body 1 thus produced comprises a black-colored outer rubber layer 3 having a tread 2 formed thereon and a whitish-colored inner rubber layer 4 serving as a color-developing layer, said outer and inner layers being fastly bonded to each other into an integral piece. In the Figure, reference numeral 5 designates bead wires and 6 designates annular projections formed on the respective side walls of the tire body 1. Alternatively, the tire body 1 may be constructed with more than two rubber layers. The inner rubber layer 4 usually has a carcass embedded in the innermost side thereof, which constitute the core of the tire.

The annular projection 6, formed on each side wall of the tire body, is ground by a grinder 7 consisting of a grind stone of the order of G.C. No. 60, by appling said grinder to the central portion of said projection, in such a manner that the interior portion of said annular projection 6 is ground off completely to form an annular groove 10 defined by concentric annular collars 8 and 9 as shown in FIG. 2. The operation of forming the annular groove 10 is preferably carried out by securely mounting the tire body 1 on a suitable annular support and rotating said annular support with the grinder applied to the side wall of the tire body.

Upon completion of the grinding, the inner rubber layer 4 of the tire body 1 is exposed between the annular collars 8 and 9 defining the annular groove 10. The exposed surface of the inner rubber layer 4 is somewhat rough as a result of grinding. The degree of roughness of the exposed surface of the inner rubber layer is variable depending upon the grain size of the grind stone used, so that, by properly selecting the grain size, a smooth surface of the inner rubber layer can be obtained. However, in order to obtain a satisfactory bond between the inner rubber layer and the undercoating layer and the fluorescent layer to be described later, and to preclude possible loading of the grinding surface of the grinder, it is rather preferable that the exposed surface of the inner rubber layer is not completely smooth.

On the interior surface of the annular groove 10 is then formed the undercoating layer 11 by applying thereto an anchoring agent consisting of a graft polymer, and thereafter a fluorescent paint is applied on the surface of said undercoating layer to form a fluorescent layer 12. The undercoating layer 11 plays an important role in preventing the fluorescent layer 12 from detaching from the surface of the annular groove 10 and, therefore, is preferably formed on an adhesive compound of branched structure, such as chloroprene graft polymer, so that said layer may be capable of following the flexion of the tire during running in particular. This undercoating layer 11 is required to be transparent so as not to impair the color-developing function of the inner rubber layer 4 of the tire. The undercoating layer 11 also serves to keep the fluorescent layer 12 fresh by protecting it against the deleterious affect of the inner rubber layer.

The anchoring agent to be used for the formation of the undercoating layer 11 may be a mixture of 100 parts of natural rubber, 30 parts of methyl methacrylate and 500 parts of toluene, or a solution prepared by mixing 20 parts of methyl methacrylate, 20 parts vinyl acetate monomer and 500 parts of toluene with 100 parts of chloroprene rubber with stirring at 80°C for about 8 hours to carry out graft polymerization and dissolving the polymerization product in 500 parts of methyl ethyl ketone.

The fluorescent paint to be used for the formation of the fluorescent layer 12 is a mixture of a composition A and a composition B at the proportion of 1:1, said composition A consisting of a mixture of 100 parts of chlorosulfonated polyethylene ("Hypalon" No. 20 or No. 40 of Du Pont Company) as a base, 4 parts of magnesium oxide as a vulcanizer, 50 parts of Rhodamine B as a fluorescent pigment, 0.5 part of "Tinuvin-P" (the trade-name of a product of Geigy Company in Switzerland) as an ultraviolet ray absorbing compound and 1000 parts of toluene as a solvent; and said composition B consisting of a mixture of 3 to 5 parts of terdin modified thermoplastic phenol resin ("Durez" RP 1045 of Durez Plastics & Chemicals Inc. or "Light Resin" TR 12603 of Sumitomo Durezu K.K.) of low viscosity as an adhesive, 10 to 15 parts of epoxy resin ("Epon" No. 828 of Shell Chemical Company or "Adekaresin" EP 4000 of Asahi Denka K.K.), 1 part of 2-mercaptoimidazoline power (Na–22 of Sumitomo Kagaku K.K.) as an accelerator and 100 parts of toluene as a solvent.

The composition B of the fluorescent paint, which is primarily composed of adhesive, bonds securely to the undercoating layer to prevent the fluorescent layer from detaching therefrom. The operation of applying the fluorescent paint in the annular groove 10 is carried out easily in a neat manner with no spreading of the paint over the adjacent area, owing to the presence of the annular collars 8 and 9. In addition, the fluorescent paint applied on the ground surface of the inner rubber layer, which has previously been coated with the undercoating layer, produces a firm bond. It is also to be noted that the annular collars 8 and 9 serve as a cushion to attenuate an external force which otherwise would be imposed directly on the fluorescent layer.

The fluorescent pigment in the composition A is preferably used in an amount from 30 to 50 parts. The use of the fluorescent pigment in an amount not more than 30 parts will result in insufficient fluorescence, whereas the use of the same in an amount not less than 50 parts will result in less content of the paint base and therefore is undesirable, although a better fluorescence can be obtained. As the fluorescent pigment, "FZA" 2003 (red), 2005 (orange) and 2005 (lemon yellow) of Sinloihi Company may also be used.

The "Tinuvin-P" used as an ultraviolet ray absorbing compound effectively absorbs ultraviolet rays and prevents the fading of the fluorescent pigment when used in an amount of about 0.5 to 1 part. The use of the compound in an amount more than specified above will give an adverse affect on the fluorescent pigment and therefore is undesirable.

The fluorescent paint of the composition described above, when applied on the surface of the undercoating layer 11, is cured slowly at room temperature as a result of cross linking reaction therebetween and fastly bonded to said surface in 3 to 5 days, forming the fluorescent layer 12.

The fluorescent layer 12 thus formed is further superposed by a top-coating layer 13. This top-coating layer 13, like the undercoating layer 11, is required to be transparent and is provided primarily for the purpose of preventing the fading of the fluorescent pigment by ultraviolet rays and improving the weather-resistance of said fluorescent pigment. The top-coating layer 13 is also required to be capable of protecting the fluorescent layer 12 against dirt and to withstand washing with water so that dirt attached to the surface thereof can be simply removed by water-washing. As described previously, the fluorescent layer 12 contains the ultraviolet ray absorbing compound therein but the amount of such compound is limited in consideration of its adverse affect on the fluorescent pigment. In this way, the provision of the topcoating layer is effective to further lessen the fading of the fluorescent pigment by ultraviolet rays.

The top-coating layer 13 is formed of a mixture of a composition *a* and a composition *b* at the proportion of 1:1, said composition *a* consisting of a mixture of 100 parts of "Hypalon", 4 parts of magnesium oxide and 1.5 parts of "Tinuvin-P", diluted about 10 times with xylene, and said composition *b* consisting of a mixture of 1 part of 2-mercaptoimidazoline, 5 parts of phenolic adhesive and 15 parts of epoxy-type adhesive, diluted about 10 times with xylene.

Now, a method of forming a plurality of fluorescent color bands on each side wall of the tire body will be explained with reference of FIGS. 5 to 9. According to this method, the annular projection 6 on each side wall is ground with a grinder 7' having two annular grooves 14, 14 formed in the peripheral surface thereof, whereby three annular grooves 10' are formed in said annular projection 6 as shown in FIG. 7. Then, an undercoating layer 11', a fluorescent layer 12' and a top-coating layer 13' are formed in each of the annular grooves 10' in the same manner as described previously. The grinder to be used for the formation of the annular grooves 10' may be composed of three thin grind stones 7'', each having a thickness of 1.5 to 3 mm, arranged in juxtaposed relation with a spacer 15 interposed between adjacent ones in the manner shown in FIG. 9. Obviously, the number and the width of each of the annular grooves 14 should be determined in accordance with the number and the width of the fluorescent color bands desired.

Referring to FIGS. 10 and 11, there is shown a device used for the formation of the undercoating layers, the fluorescent layers or the top-coating layers in the respective grooves 10'. When the device is to be used for the formation, for example, of the fluorescent layers, a fluorescent paint or paints, contained in respective tanks 16, 16' and 16'', are discharged into respective conduits 19, 19' and 19'' by the pressure of compressed air which is supplied through a three-way valve 17 and has had the pressure thereof regulated by respective reduction valves 18, 18' and 18'', and thereafter injected into the respective annular grooves 10' in a suitable amount through respective injection nozzles 20, 20' and 20''. By the use of the device described, it is possible to inject fluorescent paints of different colors into a plurality of annular grooves in each side wall of the tire body all at once.

Described and illustrated hereinabove is the method by which a fluorescent paint or paints are injected in the respective grooves after said grooves have been formed in the annular projection on the exterior surface of the tire body. This method is adapted for use with a bicycle tire having a relatively thin wall thickness. However, where the side wall portions are substantially flat as in the case of automobile tires, the annular groove 10' may be formed by grinding said side wall portion directly.

According to the present invention, in which, as described above, a single or a plurality of annular grooves are formed in the exterior surface, particularly in the side walls, of a tire body by a grinder and then a fluorescent paint is applied in the groove or grooves, a fluorescent color band or bands can be formed more uniformly than by the conventional methods, in an efficient and neat manner. Further, the fluorescent color band and bands thus formed will not be detached easily from the tire body due to the strong bond between the rubber layer of the tire body and the fluorescent paint. According to the conventional methods, a fluorescent layer must comprise a color-developing layer to promote the color-developing effect of said fluorescent layer and an ultraviolet ray absorbing layer to enhance the luminous effect of said color-developing layer as well as to prevent fading of said color-developing layer by ultraviolet rays. However, according to the invention as claimed herein, the tire body is constructed with an abrasion-resistant outer rubber layer and a color-developing inner rubber layer integral with said outer layer, and a fluorescent paint containing an ultraviolet ray absorbing compound is applied on the surface of said inner rubber layer exposed in a single or a plurality of annular grooves formed in the side walls of the tire body by grinding said side walls, or a fluorescent paint layer and a top-coating layer containing the ultraviolet ray absorbing compound are formed in said annular groove or grooves in the order mentioned. Therefore, there is no need of forming a color-developing layer on the exterior surface of the tire body. This is advantageous in simplifying the color band forming process. Still further, according to the present invention, since the transparent undercoating layer of an anchoring agent, consisting primarily of a graft polymer, such as chloroprene rubber, is interposed between the fluorescent paint layer and the exposed surface of the inner rubber layer of the tire body, intrusion of a vulcanizer such as sulfur, contained in the tire body, into the fluorescent paint layer can be prevented, whereby the fluorescent paint layer can be retained fresh over a long period of time. It is also to be noted that, since the undercoating layer of a graft polymer has a suitable elasticity, it is capable of following the flexion of the tire body during running and this is also advantageous in preventing the delamination of the fluorescent paint layer from the tire body.

What is claimed is:

1. A tire comprising a tire body constructed with an abrasion-resistant outer rubber layer and a color developing inner rubber layer integrally bonded to said outer rubber layer, and at least one fluorescent color band consisting of a laminate of an elastic undercoating layer consisting of a transparent anchoring agent and a fluorescent layer containing an ultraviolet ray absorbing compound, said at least one fluorescent color band being formed in at least one annular groove formed in each side wall of the tire body to expose the inner rubber layer of said tire body.

2. A tire comprising a tire body constructed with an abrasion-resistant outer rubber layer and a color developing inner rubber layer integrally bonded to said outer rubber layer, and at least one fluorescent color band consisting of a laminate of an elastic undercoating layer consisting of a transparent anchoring agent, a fluorescent layer and a transparent top-coating layer containing an ultraviolet ray absorbing compound, said at least one fluorescent color band being formed in at least one annular groove formed in each side wall of the tire body to expose the inner rubber layer of said tire body.

3. A tire comprising a tire body composing of an outer rubber layer having an abrasion resistance and a white inner rubber layer having a color development effect, said white inner rubber layer consisting of 100 parts of rubbers of general use as a main content and 1.5 to 1.75 parts of sulphur as a vulcanizing agent, an under layer of a transparent reinforcing adhesive agent having a resiliency disposed within at least one annular recess formed by cutting off the side wall portion and a fluorescent layer including a layer absorbing an ultraviolet ray.

4. A tire comprising a body including an abrasion-resistant outer layer superimposed upon and integrally bonded to a color-developing inner layer, a portion of said inner layer being exposed through said outer layer and presenting a different color than said outer layer, said outer layer defining a groove through which said portion of said inner loop is exposed, and including a coating of fluorescent material in said groove over said inner layer portion.

5. The tire of claim 4, including a layer of transparent anchoring agent between said inner layer and said fluorescent coating.

6. The tire of claim 5, said fluorescent coating including an ultraviolet ray absorbing compound.

7. The tire of claim 5, including a layer of transparent top-coating material over said fluorescent coating, said top coating material including an ultraviolet ray absorbing compound.

* * * * *